United States Patent Office 3,447,372
Patented June 3, 1969

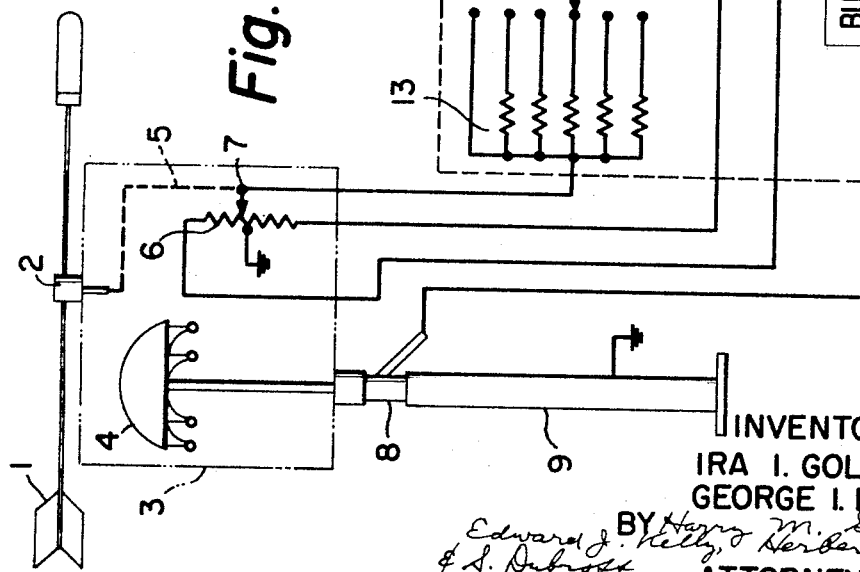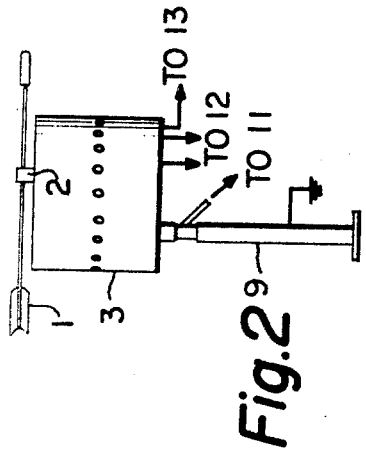

3,447,372
CROSSWIND SENSING SYSTEM
Ira I. Goldberg and George I. Fisher, Philadelphia, Pa., assignors to the United States of America as represented by the Secretary of the Army
Filed Mar. 30, 1967, Ser. No. 628,233
Int. Cl. G01w 1/02
U.S. Cl. 73—189      5 Claims

ABSTRACT OF THE DISCLOSURE

A crosswind sensing system of simplified construction is adapted for use directly on military vehicles and gun carriers to derive accurate indication and windage data for correction of the direction of the gun with respect to the crosswind, said system being provided in a wholly self-contained unitary structure under protection of casing means which serves to control the amount of wind about highly responsive sensing means therein.

---

This invention relates to an electronic wind direction sensing system, and more particularly, to a crosswind sensing system of that type.

A crosswind sensing system in accordance with the said invention is adapted to sense the presence and magnitude of a crosswind component of the total surface wind and to feed derived information into utilization means which may include storage, indication, and computer control elements. The system in one form may comprise a wind sensing unit mounted on a variable height mast, wind attenuating and instrument casing means, and an electronic crosswind conversion unit which contains the newly developed and improved electronic circuitry to achieve the crosswind velocity to electronic signal transformation.

Prior art attempts to solve the problem of accurately determining and automatically producing crosswind correction data for assimulation by computers have not been satisfactory. The field has progressed only to the point where obtained windage correction information is manually fed into a computer for use thereby. The problem with such systems is that wind information, after measurement, must be transported to the computer site and then manually transferred to the computer. As this process is time consuming and since the wind is continually shifting, the prior art suffers the defect that the wind data received by the computer is delayed, outdated, and, as is often the case, useless.

It is, therefore, an object of the present invention to provide a crosswind sensing and evaluating system which is capable of constantly and continually deriving information relating to the magnitude and direction of the crosswind component of a total surface wind whereby fresh, updated, and accurate wind data may be provided for a ballistic, analog computer and similar utilization means.

It is also an object of the invention to provide a wind sensing system which operates to derive an indication of the magnitude and direction of the crosswind component of a total surface wind with respect to a reference, and to translate a continuous, electrical output indicative of the sensed crosswind component.

It is a further object and aspect of the invention to provide a crosswind sensing apparatus that is as portable as the vehicle that supports it and thus provide accurate crosswind direction information as above indicated at the utilization site.

It is also a more specific object of the invention to provide a crosswind sensing system of the type referred to which is adapted to be mounted on and carried by a military vehicle of the artillery gun type, the crosswind to be sensed being at right angles to the longitudinal axis of the gun barrel regardless of the particular position of the barrel or the instantaneous and variable direction of the total surface wind.

The invention will more readily be understood from the following description of a presently preferred embodiment thereof, when considered with reference to the accompanying drawings.

In the drawing, FIG. 1 is an electrical block circuit diagram showing a crosswind sensing system embodying the invention, and FIG. 2 is a side-view of a portion of the system of FIG. 1 showing further details thereof in accordance with the invention.

Referring to FIG. 1, the system includes a wind sensing unit comprising a wind vane 1, operably connected at its fulcrum or pivot point 2 to a wind attenuator and a casing unit 3 which includes a thermopile wind sensor element 4, a mechanical linkage 5, and a cosine potentiometer 6, having a contact arm 7. In addition, the system includes an adapter 8, an adjustable height mast 9, and a crosswind conversion unit 10, which includes a thermopile voltage bucking circuit 11, a DC to DC high gain magnetic amplifier 12, a time constant selector circuit 13, an indicating device 14 which may be a meter, a memory circuit 15, a DC to AC low gain magnetic amplifier 16, a filtering and phasing circuit 17, and utilization means 18 which may be a ballistic, analog computer having a second indicating device 19 in connection therewith, if desired.

The above elements are adapted to operate in the following manner. An adjustable height mast 9 is first set at the desired height to catch the wind. As the wind blows, the wind vane 1 is influenced and appropriately positioned by the wind such that it points in the direction of the resultant wind vector. The mechanical linkage 5 is connected between the fulcrum 2 of the wind vane 1 and the contact arm 7 of the cosine potentiometer 6 and moved to the contact arm 7 in response to the movement of wind vane 1 thereby positioning the contact arm 7 in relation to the direction of the resultant wind vector.

The same wind that positions the wind vane 1 also blows across the wind attenuator unit 3. This unit comprises a protective cylinder totally encasing the thermopile sensor 4 and the cosine potentiometer 6. As shown in FIG. 2, the protective cylinder is in a peripheral ring or belt perforated to include a plurality of relatively small holes; there are 35 such holes 0.040 inches in diameter, thereby permitting only a small fraction of the total wind to strike and surround the thermopile. This protective cylinder performs the dual function of both shielding the inner components from physical damage caused by changing weather conditions and acting as a wind attenuator. The wind is attenuated so that the thermopile need operate over only a very narrow portion of its operating range thereby linearizing the thermopile output. The thermopile used is a commercial Hastings-Radyst type N7–B non-directional thermopile. The operation of this unit will now be explained.

Generally a thermopile is, and presently includes, a cluster of thermocouples, each of which is heated to a preselected temperature by passing electric current therethrough. The total wind blowing across the thermopile carries away some of this heat by convection. The greater the magnitude of the wind, the greater is the amount of heat carried away.

The difference between the initial, preset temperature and the temperature reached after the heat is carried away is sensed by the thermopile which, responsive to this temperature gradient, produces a direct current output through the adapter connection 8. This output is proportional to the heat lost by convection and, hence, to the magnitude of the total wind.

The characteristics of the thermopile are such that if a graph be made of output voltage as the ordinate against wind velocity as the abscissa over the thermopile's operating range, the plot would resemble an hyperbola of the form $xy=a$ constant such that for zero wind velocity, the voltage would be infinite and for infinite wind velocity, the voltage would be zero. As it was desired to obtain the inverse condition, that is, zero wind velocity resulting in zero voltage output and a corresponding increase in wind velocity resulting in a corresponding increase in output voltage, it is necessary to feed the thermopile output voltage into an inverting circuit such as voltage bucking circuit 11 which yields this desired result. The bucking circuit may comprse a battery connected in bucking relation with its polarity reversed with respect to the thermopile output voltage. In this embodiment a voltage divider and rectifier are provided thereby allowing the tapping off of voltages over a small operating range.

The output of the bucking circuit is fed into a relatively high gain magnetic amplifier 12 which amplifies the signal and impresses it across the cosine potentiometer 6. It is noted that this signal is still direct current and is still representative of the magnitude of the total wind.

The cosine potentiometer produces a single output voltage, 90° out of phase with the total wind as sensed by wind as sensed by wind vane 1 thereby corresponding to an orthogonal component of the total wind. The case of the potentiometer is so adjusted that this output voltage is always indicative of that component of the corresponding wind direction that is at right angles to the reference position in the horizontal plane. For example, if it is assumed, first, that the reference position is the longitudinal axis of the gun barrel, and, second, that the gun barrel is pointed due north and the wind is blowing from southwest to northeast, that is, 45° above the horizontal, the two orthogonal components of the wind would be due north and due east. The northerly wind component would be parallel to the reference, that is, along the longitudinal axis of the gun barrel, and would not be sensed by the cosine potentiometer 6. The easterly component, however, at a right angle to the gun barrel, would be sensed by the cosine potentiometer 6, tapped off at the contact arm 7, and fed to the time constant selector circuit 13.

It is noted, however, that the cosine potentiometer 6 could readily be replaced by a sine-cosine potentiometer (not shown). The latter potentiometer produces two output voltage 90° out of phase with each other which correspond to both of the orthogonal components of the total wind. The case of this potentiometer would be preadjusted so that the two outputs would be, respectively, parallel to the reference position and at right angles to the reference position, both components being measured in the horizontal plane.

That component which is at right angles to the reference position would be identical to the component produced by the cosine potentiometer 6 of the present embodiment. Hence this component would be indicative of the crosswind component of the total wind.

The other component produced by the sine-cosine potentiometer would be parallel to the reference position (the gun barrel) and is indicative of the range wind. Such an output could readily be utilized in a system substantially identical to the shown present embodiment. All that would be required is to feed the parallel output from the sine-cosine potentiometer into a parallel or dual channel comprising components identical to elements 13 through 17 shown in FIG. 1.

A modification such as noted here would make available wind range data as well as crosswind data. Both sets of information could then be assimilated by the utilization means 18.

The selector circuit comprises a plurality of series resistors of different ohmic value and a large, shunt low-leakage capacitor. The circuit may be set to any one of a plurality of time constants by merely choosing the appropriate value of resistance. In the embodiment shown, resistors were chosen to yield the time intervals of 0, 5, 15, 30, 60, and 120 seconds respectively. This circuit has the property of integrating the cosine potentiometer output and obtaining an average voltage value over the time selected. It is generally necessary to obtain such an average as the continually shifting wind usually makes instantaneous data unuseable, though with the resistance shorted out (the zero second condition) instantaneous data is made available. For example, instantaneous information, if fed into a computer, would cause the gun to virtually oscillate in response to the wind and would thus cause it to become ineffective and inaccurate. Note, however, that the proper choice of resistors allows complete flexibility of time selection from instantaneous to preselectable discreet values. Also, the instant invention is not limited to the time constants shown above.

The average voltage value, indicative of both the magnitude and direction of the crosswind, may now be monitored by a suitable meter or indicating device 14 (calibrated to read the magnitude of the crosswind velocity directly) as well as being fed into a memory circuit 15 for both storage and control purposes. The element 16 is a relatively low gain magnetic amplifier as pointed out therein before and which, upon receipt of a signal from memory circuit 15, both amplifies and modulates said signal with an AC signal derived from any suitable source (not shown). The purpose of the modulation is to obtain a wave shape that can be assimilated by the utilization means. In the present embodiment, 400 cycles per second was used as the modulating frequency, thereby producing at the output of magnetic amplifier 16, a 400 cycle per second sinusoid with an amplitude proportional to the magnitude of the crosswind velocity. This sinusoid is filtered by a 400 cycle per second resonant filtering and phasing circuit 17 to obtain a further refined wave shape having the same phase and form as the other inputs to the ballistic computer and is, in turn, fed directly into utilization means 18 for use thereby.

From the foregoing description it will be seen that the crosswind sensing system of the present invention derives accurate windage information at the utilization site and permits the automatic positioning of the gun of an artillery vehicle in response thereto.

We claim:

1. In a system for automatically sensing the crosswind component of a total surface wind, and for producing an electronic response indicative thereof, the combination comprising, means positioned to be exposed to wind currents and to move and be oriented in the direction of a resultant wind vector, electrical control means having a movable control element connected with said first named means to move therewith, electrical wind sensing means adapted to produce a voltage output proportional to the magnitude of said resultant wind vector, circuit means connected through said electrical control means with said wind sensing means for deriving a linearized output voltage therefrom indicative of said vector magnitude and representative of an orthogonal component of said result wind vector, means encasing said sensing means and said circuit means, said encasing means also being adapted to attenuate said total surface wind and, electronic circuit means responsive to said output voltage as the modulation component to produce an amplitude-modulated alternating current signal output having predetermined phase and frequency characteristics, and an amplitude which is proportional to the magnitude of the crosswind velocity sensed by the system.

2. In a system for continuously and accurately sensing the crosswind component of a surface wind, the combination of, a variable height supporting means positioned in an area common to a total wind current to be sensed and indicated, movable wind sensing means mounted on said last-named means and adapted to be oriented in the direction of the total wind vector, transducer means responsive to total wind magnitude for providing an electrical signal proportional to said magnitude, circuit means responsive to said electrical signal and operative to invert said signal whereby increases in total wind magnitude result in corresponding proportional increases in signal output, means connected with said last-named circuit means for amplifying said inverted signal output, further circuit means connected to receive said amplified inverted signal output and including a potentiometer connected for operation by the movable wind sensing means to control the transmission of said said signal output in response to changes in the position of said wind sensing means, thereby to separate said inverted signal output into the orthogonal components and signals indicative of the parallel and perpendicular components of the total surface wind blowing past a reference point, further means connected with said last-named circuit means and responsive to one of said orthogonal components to produce an average signal output over a preselectable time period.

circuit means adapted to amplify and modulate said average signal with an alternating current signal to produce an alternating current sinusoid the amplitude of which is proportional to the magnitude of crosswind velocity sensed by the system and the phase of which is proportional to crosswind direction with respect to a reference position, and means connected with said last-named means for filtering and phasing said sinusoid to produce an output signal suitable for computer use.

3. The combination as defined in claim 2, wherein the transducer means includes a thermopile adapted to produce an electrical signal output in response to temperature differences sensed thereby as a result of changes in the total wind magnitude, said thermopile being protected by a casing and wind attenuating element having a plurality of small sidewall perforations thereby permitting entry of only limited amounts of the total winds.

4. The combination as defined in claim 2, wherein said means producing an averaged output includes a shunt capacitor element and a plurality of resistors of various ohmic value selectably connected in series therewith.

5. The combination with a mobile, shell-firing artillery weapon having a pivotally mounted gun of, a crosswind sensing system permanently affixed thereto and transported thereby for yielding an electrical output proportional to the magnitude of crosswind velocity measured with respect to the longitudinal axis of said gun, said system including movable wind sensing electrical control means, thermal type electrical total wind sensing means, circuit means responsive to the position of the first named means and the electrical output of said last named means to produce an electrical signal output indicative of the total wind component at right angles to the longitudinal axis of said gun and, further circuit means responsive to the signal output of said last named circuit means to convert said electrical signal into an alternating sinusoid for assimilation by a utilization device.

References Cited

UNITED STATES PATENTS

| | | | |
|---|---|---|---|
| 2,377,884 | 6/1945 | Hillman | 73—204 |
| 2,574,336 | 11/1951 | Libman et al. | |
| 2,619,527 | 11/1952 | Gray | 73—189 X |
| 2,942,464 | 6/1960 | Sartor | 73—189 |

RICHARD C. QUEISSER, *Primary Examiner.*

J. W. MYRACLE, *Assistant Examiner.*

U.S. Cl. X.R.

89—41.6; 340—241